(No Model.) 2 Sheets—Sheet 1.

W. STEERS & H. HUNT.
BICYCLE SEAT.

No. 471,908. Patented Mar. 29, 1892.

WITNESSES
Wilson R. Richardson
Arthur Storey

INVENTORS
William Steers
Harry Hunt

THE NORRIS PETERS CO., PHOTO-LITHO., WASHINGTON, D. C.

(No Model.) 2 Sheets—Sheet 2.

W. STEERS & H. HUNT.
BICYCLE SEAT.

No. 471,908. Patented Mar. 29, 1892.

WITNESSES
Wm R. Richardson
Arthur Storey

INVENTORS
William Steers
Harry Hunt.

UNITED STATES PATENT OFFICE.

WILLIAM STEERS AND HARRY HUNT, OF BOSTON, MASSACHUSETTS.

BICYCLE-SEAT.

SPECIFICATION forming part of Letters Patent No. 471,908, dated March 29, 1892.

Application filed October 31, 1891. Serial No. 410,538. (No model.)

*To all whom it may concern:*

Be it known that we, WILLIAM STEERS and HARRY HUNT, citizens of the United States, residing at Boston, in the county of Suffolk and State of Massachusetts, have invented certain new and useful Improvements in Bicycle-Seats, of which the following is a specification.

Our invention relates to improvements in bicycle-seats, which are constructed principally of rubber, having air-cushions and metal nuts molded into the substance of the rubber, so that the same may be fastened to an elliptic spring connected with the seat-holder.

The objects of our improvements are to provide comfort and ease to the person using the seat, at the same time giving durability to the same, and also to absorb vibration of the machine. We obtain these objects by the mechanism illustrated in the accompanying drawings.

Figure 1:
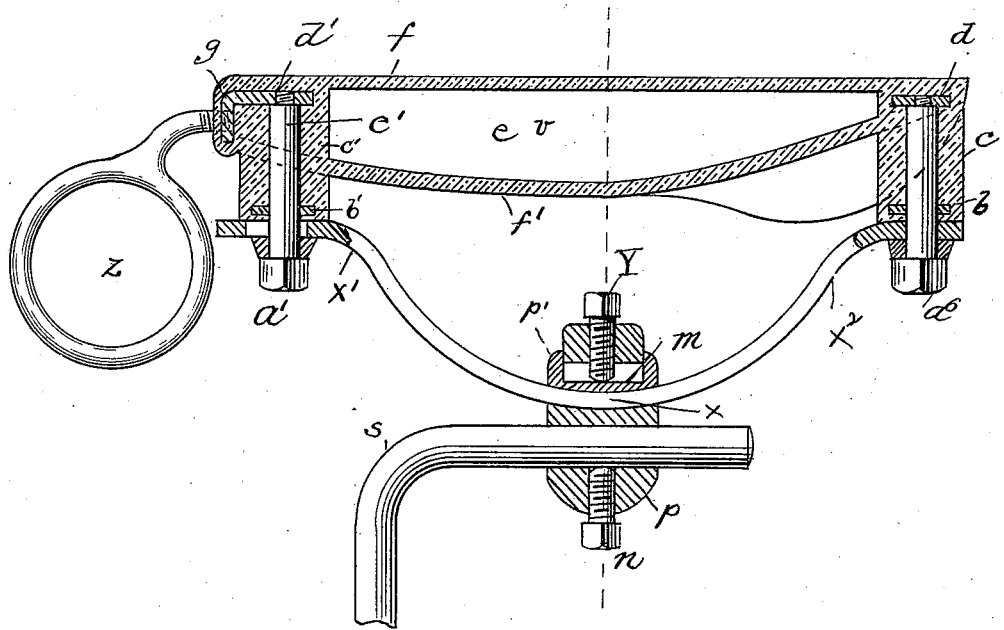
Figure 2:
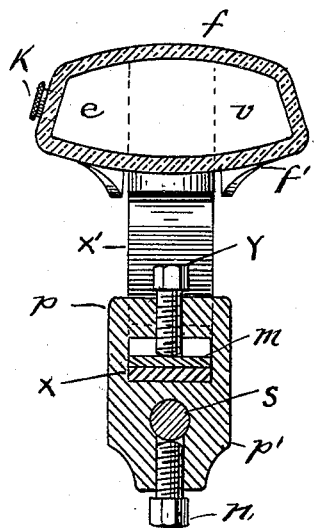
Figure 3:
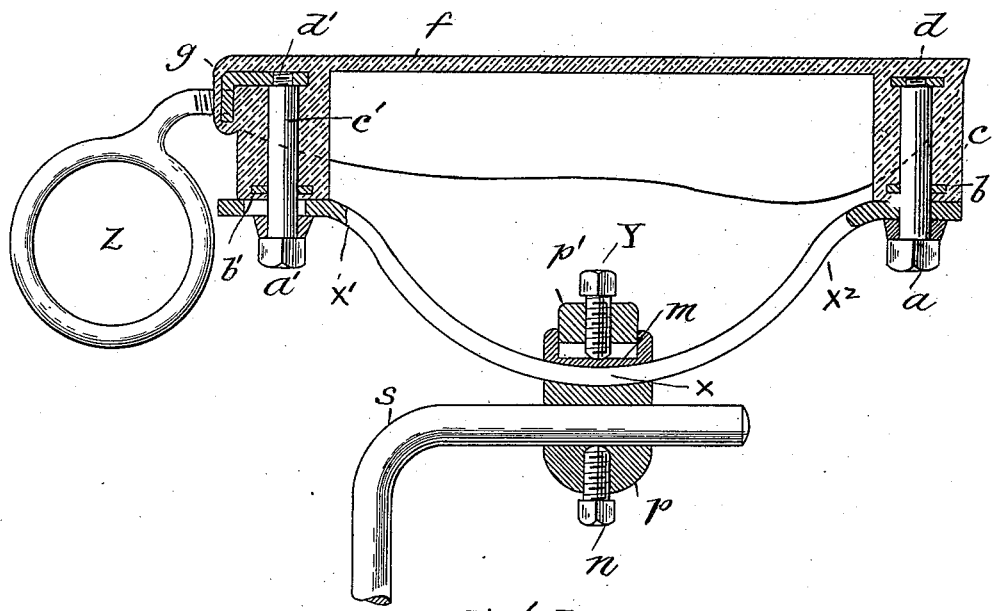

Referring to the drawings, Figure 1 is a side vertical sectional view of the saddle. Fig. 2 is an end vertical sectional view of the saddle from the rear. Fig. 3 is a side sectional view of the saddle, the same as Fig. 1, except that in the former there is no air-cushion, the seat being made of a web of rubber without the interlying air-space.

In Fig. 1, $e\ v$ is an air-space confined by the rubber sac $f$ and $f'$, which forms the supporting-seat, this air-space being intended to give ease and comfort to the occupant. The supports $c$ and $c'$ and the sac $f$ and $f'$, containing the intervening air-space, are made of an integral soft-rubber piece. In the rubber support $c$ is a metal nut $d$, embedded and molded into the substance of the support $c$. This nut has a thread into which the bolt $a$ is screwed. The metal washer $b$, through which this bolt passes, is also embedded and molded into the substance of the support $c$ for the purpose of keeping the support $c$ in place. $x'$ and $x^2$ is an elliptical spring, upon the ends of which the supports $c$ and $c'$ rest, and to which supports the ends of the spring are bolted, respectively, by means of the bolts $a$ and $a'$, which pass through the washers $b$ and $b'$, respectively, into the threaded nuts $d$ and $d'$, respectively. The embedded nut $d'$ has an elbow $g$ turned upon it for the purpose of screwing to it the bag-hook $z$. $s$ is the saddle-support to which the spring $x'\ x^2$ at its point $x$ is fastened by means of the holder $p\ p'$. This holder is fastened to the saddle-support by means of the bolt $n$.

Referring to Fig. 2, which is an end vertical sectional view of the holder, it may be described as follows, like parts being represented by the same letters in all the figures: $x'$ is the front end of the spring as it curves upward to support the front end of the saddle. This spring passes through the holder $p\ p'$ at its point $x$, where it is clamped to the holder by means of a gib $m$, which is held firmly against the spring $x'$. $k$ is an air-valve for inflation. The cored rubber supports $c$ and $c'$ and the elastic air-cushion are for the purpose of taking up vibrations, which are characteristic of a moving vehicle. The iron bolts $a$ and $a'$ form the cores to these supports and hold them upright in place. When the pressure on these supports $c$ and $c'$ is downward, the cores $a$ and $a'$ have free play downward through the embedded washers $b$ and $b'$, respectively.

We do not wish to limit our invention to a rubber saddle having only the interlying air-space $e\ v$. The seat or saddle may be constructed without the air-sac for the air-cushion by using instead a web of rubber for the seat, as in Fig. 3.

Having described our invention, what we claim, and desire to secure by Letters Patent, is—

1. In a rubber bicycle-saddle, in combination, the air-cushion $e\ v$, the support $c$, having the embedded nut $d$, the support $c'$, having the elbowed embedded nut $d'$, the embedded washer $b$, the holder $p\ p'$, the gib $m$, and the spring $x'\ x^2$, substantially as and for the purpose described.

2. In a rubber bicycle-saddle, in combination, the support $c$, having the embedded nut $d$, the support $c'$, having the elbowed embedded nut $d'$, the embedded washer $b$, the holder $p\ p'$, the gib $m$, and the spring $x'\ x^2$, substantially as and for the purpose set forth.

3. The combination, in a bicycle-saddle, of the web or seat portion $f$, depending compressible supports at the opposite ends thereof, a bent spring having its respective ends engaging the lower end of one of said compressible supports, and means for securing said ends of the spring to said supports, substantially as shown and described.

4. The combination of the saddle having an air-cushion and depending compressible supports located at opposite ends of said saddle, with the curved spring having its respective ends engaging the lower end of one of said compressible supports, and means for securing said ends of the spring to said supports.

5. In a rubber bicycle-saddle, the embedded nut $d'$, having the elbow $g$, substantially as and for the purpose described.

6. The combination, in a rubber bicycle-saddle, of the web $f$, the cored rubber supports at the ends thereof, nuts embedded in said supports, bolts engaging said nuts and extending vertically through said cored supports, and supporting means interposed between the lower ends of said cored supports and the heads of the bolts, all substantially as described, and for the purposes specified.

7. The combination, in a rubber bicycle-saddle, of the cored rubber supports at the ends thereof, nuts embedded in said supports, bolts engaging said nuts and extending vertically through said cored supports, and a spring having the opposite ends interposed between the lower ends of said cored supports and the heads of said bolts and perforated for the passage of said bolts, all substantially as described, and for the purposes specified.

8. The combination, in a rubber bicycle-saddle, of the inflatable seat portion having cored rubber supports at their ends, a nut and a washer embedded in each of said cored supports and arranged near the top and bottom thereof, respectively, bolts engaging said nuts and extending through said washers, and a supporting-spring having its ends located between the lower ends of said cored supports and the heads of said bolts and perforated for the passage of said bolts, all substantially as shown and described.

WILLIAM STEERS.
HARRY HUNT.

Witnesses:
WILSON R. RICHARDSON,
ARTHUR STOREY.